US008806607B2

(12) United States Patent
Archer et al.

(10) Patent No.: US 8,806,607 B2
(45) Date of Patent: Aug. 12, 2014

(54) UNAUTHORIZED DATA TRANSFER DETECTION AND PREVENTION

(75) Inventors: Steven T. Archer, Dallas, TX (US); Paul V. Hubner, McKinney, TX (US); Kristopher A. Pate, Sachse, TX (US); Francisco A. Dias, Krum, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 935 days.

(21) Appl. No.: 12/190,072

(22) Filed: Aug. 12, 2008

(65) Prior Publication Data

US 2010/0043047 A1    Feb. 18, 2010

(51) Int. Cl.
| G06F 17/00 | (2006.01) |
| G06F 7/04 | (2006.01) |
| G06F 12/14 | (2006.01) |
| H04L 29/06 | (2006.01) |
| H04L 9/32 | (2006.01) |
| G06F 15/173 | (2006.01) |
| G06F 21/62 | (2013.01) |
| H04L 29/08 | (2006.01) |
| H04L 12/26 | (2006.01) |

(52) U.S. Cl.
CPC ........ *H04L 63/0227* (2013.01); *H04L 63/0263* (2013.01); *H04L 63/0236* (2013.01); *H04L 63/102* (2013.01); *H04L 63/0876* (2013.01); *G06F 21/6218* (2013.01); *H04L 9/3281* (2013.01); *H04L 29/08099* (2013.01); *H04L 43/028* (2013.01)
USPC .................. 726/13; 726/4; 726/22; 713/153; 713/154; 713/165; 713/168; 713/170; 709/224; 709/225

(58) Field of Classification Search
CPC ............ H04L 63/0227; H04L 63/0263; H04L 63/0236; H04L 63/102; H04L 63/0876; H04L 9/3281; H04L 29/08099; H04L 43/028; G06F 21/6218
USPC .............. 726/1, 4, 13, 22; 713/153, 154, 165, 713/168, 170; 709/224, 225
See application file for complete search history.

(56) References Cited

U.S. PATENT DOCUMENTS

| 7,673,043 | B2 * | 3/2010 | Keir et al. ..................... 709/224 |
| 2004/0044758 | A1 * | 3/2004 | Palmer et al. ................. 709/223 |
| 2004/0225645 | A1 | 11/2004 | Rowney et al. |
| 2005/0076228 | A1 * | 4/2005 | Davis et al. ................... 713/188 |
| 2006/0028999 | A1 * | 2/2006 | Iakobashvili et al. ........ 370/252 |
| 2006/0149844 | A1 * | 7/2006 | Droz et al. .................... 709/227 |
| 2006/0149965 | A1 * | 7/2006 | Sharma ......................... 713/163 |
| 2006/0179141 | A1 * | 8/2006 | John et al. ..................... 709/225 |
| 2007/0180225 | A1 * | 8/2007 | Schmidt ........................ 713/152 |
| 2007/0274307 | A1 * | 11/2007 | Karino et al. ................. 370/389 |
| 2008/0148382 | A1 * | 6/2008 | Bartholomy et al. ........... 726/11 |
| 2009/0292779 | A1 * | 11/2009 | Edlund et al. ................. 709/206 |

OTHER PUBLICATIONS

Article titled "Vontu Announces Industry's First Data Firewall to Battle Insider Information Leakage and Identity Theft" dated Jan. 13, 2004 (3 pages).

* cited by examiner

*Primary Examiner* — Aravind Moorthy

(57) ABSTRACT

A method includes receiving a policy via a network connection, wherein the policy includes at least one signature. Receiving a data communication message from a processor of a computing device via a system bus. Identifying a class, and selectively forwarding the data communication message based in part on the received policy and the identified class.

25 Claims, 8 Drawing Sheets

UNAUTHORIZED DATA TRANSFER DETECTION AND PREVENTION

BACKGROUND INFORMATION

Many organizations connect their computers to internal and external networks, including the Internet. Through such connections, these organizations enable users to easily share data, but also expose their systems and their data to various threats, including viruses and hackers. To combat threats of viruses and hackers, these organizations often use a combination of desktop virus scanning software and hardware firewalls. Typically, virus scanning software is accessible and run in the context of an operating system on a local computing device. As such, this software can become compromised in many ways, such as by being disabled by a savvy user, corrupted by a software defect, etc. Hardware-based firewalls, on the other hand, are typically very specialized and expensive devices that are situated between two networks, such as between a corporate internal network and the Internet. As such, communications within an organization often bypass hardware-based firewalls. As many organizations are increasingly relying on computer systems to handle their confidential data, protecting their data is becoming increasingly important.

While organizations typically attempt to protect their data from viruses and hackers, many organizations are now also attempting to protect their confidential data from certain internal threats, such as an unauthorized data transfer. For example, a user may accidentally email confidential data to an unintended recipient, or a disgruntled employee may intentionally disclose confidential data to an outsider. Many organizations may desire tools to manage such unauthorized data transfers, including tools that enable the organization to detect, monitor, and prevent the disclosure of confidential data.

DETAILED DESCRIPTION

Figure 1:
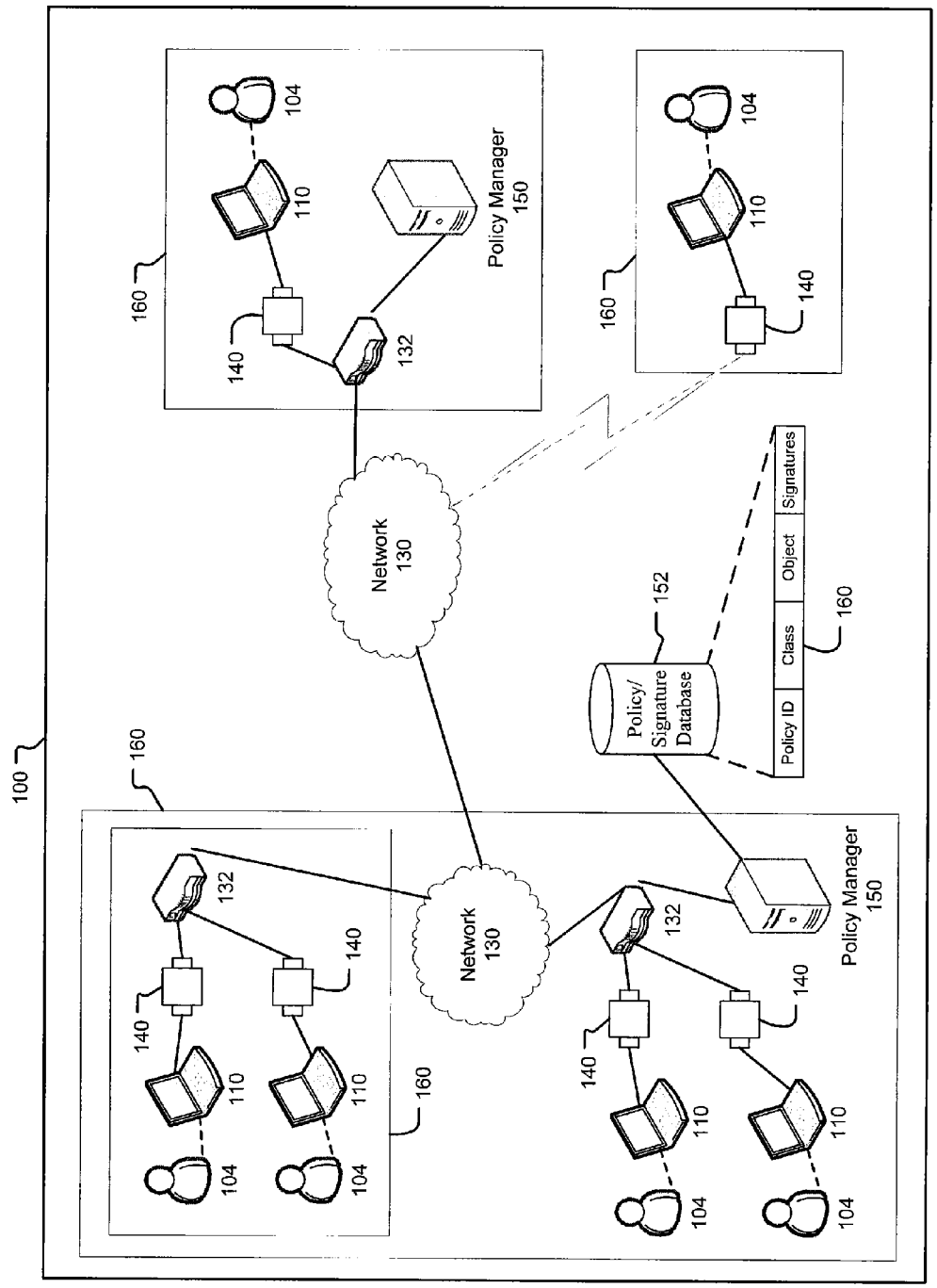
FIG. 1 illustrates an exemplary system for managing unauthorized data transfers.

FIG. 1 illustrates an exemplary system 100 for managing unauthorized data transfers. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

Generally, an unauthorized data transfer is any transfer of data that a user is not authorized to make; is against the policies of an organization; would harm the organization's reputation; could cause financial harm or result in ill-gotten gains; or could potentially provide information to someone who is not authorized to have such information. Examples include a disgruntled employee leaking company secrets, or a user accidentally sending an email containing confidential information to an unintended recipient. Such an unauthorized data transfer may occur as an intra-office communication, such as between employees of the same company, or an inter-office communication, such as between one organization and another entity. System 100 manages such unauthorized data transfers by monitoring electronic communications, and performing an action if a suspected unauthorized data transfer occurs.

As illustrated in FIG. 1, system 100 generally includes a computing device 110 that may be selectively accessed by one or more users 104. Computing device 110 is typically capable of transferring electronic data with another device, such as another computing device 110. Computing device 110 may transfer such data by way of a network 130 using a network access device or router 132. As will be discussed in detail below, electronic communications between computing device 110 and another device may pass through a traffic analyzer 140.

User 104 may be a person operating computing device 110 locally or remotely, or user 104 may be any automated computer program or script that facilitates a data transfer. For example, user 104 may be an authorized user of a computing system, an employee of an organization, a guest, an unauthorized user, or any other person accessing computing device 110. Furthermore, user 104 may be an automated computer program, or an interactive computer program, providing remote access to computing device 110. For example, user 104 may be a virus or some other computer program that causes computing device 110 to communicate electronic data with another computing device 110.

Computing device 110 may be any device capable of transferring electronic data, possibly over network 130, either through a wire or cable or wirelessly. For example, computing device 110 may be a server computer, a computer workstation, a desktop computer, a notebook computer, a laptop, a handheld computer, a personal digital assistant (PDA), a game console, an information appliance, a cellular phone, a smart-phone, or some other computing device capable of communicating over network 130.

Computing device 110 typically communicates with another computing device 110 through router 132 over network 130. Network 130 is typically an Internet protocol (IP) network that utilizes known protocols found within the Internet protocol suite. For example, network 130 may use protocols such as user datagram protocol (UDP), transmission control protocol (TCP), hypertext transfer protocol (HTTP), etc. Further, network 130 may include a variety of networks such as a wide area network (WAN), e.g., the internet, a local area network (LAN), a wireless network, such as a Bluetooth, Wi-Fi, or cellular network, etc. Computing device 110 typically accesses network 130 by way of router 132.

Router 132 is known for routing data packets in packet switched network 130. Router 132 allows computing device 110 to access packet switched network 130. By communicating with router 132, computing device 110 is able to exchange data with one or more devices that can also communicate with network 130. Router 132 may be a wired or wireless device, or a device that includes both wired and wireless communication mechanisms. As illustrated in FIG. 1, computing device 110 typically connects to network 130 or router 132 through traffic analyzer 140.

Traffic analyzer 140 generally is a specialized device or component, e.g., a network interface card (NIC), network adapter, or similar device, for facilitating the transfer of data between computing devices 110 via a network 130. Generally, traffic analyzer 140 intercepts data communications between a computing device 110 and a network 130, for example, by monitoring electronic communications sent from and received by computing device 110, and may perform one or more actions based on the monitored electronic communication. Traffic analyzer 140 may monitor electronic communications between computing device 110 and another device that are communicating through network 130. Traffic analyzer 140 may be in selective communication with one or more computing devices 110, a policy manager 150, or any one of a number of different systems or devices, including a public switched telephone network (PSTN). As shown in FIG. 1, one traffic analyzer 140 is associated with one computing device 110, creating a one-to-one relationship. Typically, traffic analyzer 140 receives a number of different inputs, including a policy received from a policy manager 150.

Policy manager 150 is typically a computing device including a medium storing instructions for performing various operations, including communicating with traffic analyzer 140 via network 130. For example, policy manager 150 may be capable of providing a policy to traffic analyzer 140, receiving alerts from traffic analyzer 140, receiving data from traffic analyzer 140, re-configuring traffic analyzer 140, and providing an alert to a computing device 110. Policy manager 150 may be a server or other computing device that includes a processor, memory, and computer-readable medium. Further, policy manager 150 may also include one or more databases for storing, analyzing, and retrieving data, as shown in FIG. 1. Such a database may include a plurality records, e.g., in one or more tables, including storing various relationships that pair various users 104, computing devices 110, and networks 130 with various classes 160. Policy manager 150 may also include a web server and an administrative user interface. Further, policy manager 150 may be configured to perform one or more tasks based on a communication with traffic analyzer 140, as will be discussed in detail below.

As illustrated in FIG. 1, users 104, computing devices 110, and networks 130 may be organized in terms of a class 160. These relationships may be arbitrarily defined by an organization, and stored in a policy/signature database 152. Further, policy manager 150 may utilize database 152 to store, update, edit, delete, and retrieve data corresponding to a policy, including one or more classes 160. Class 160 is generally any type of classification, grouping, label, attribute, security level, clearance level, or some type of designation that can be associated with a user 104, a computing device 110, a traffic analyzer 140, a network 130, data, etc. For example, class 160 may be a group of users 104, such as all authorized users of a network, e.g. employees. Users 104 may be organized by multiple classes 160, including sub-classes 160. For example, while a class 160 may be associated with all authorized users 104, other classes 160 may designate users 104 with higher-level permissions, such as management.

Class 160 may be associated with one or more other attributes as well, such as a physical location, a network grouping, an organizational unit, a hierarchical organization structure, etc. For example, class 160 may include all users 104 residing in the headquarters of a company. Class 160 may also be based on individual organizational units, such as an accounting group, an information technology group, a human resources group, a management group, or the like. Class 160 may be used to designate a group of computing devices 110. For example, class 160 may be associated with all portable computing devices 110, such as laptops, notebook computers, personal digital assistants.

Class 160 may also be used to designate different security levels or authorization levels, thereby designating groups of employees authorized to access and transmit certain types of information. Further, class 160 may designate different networks, such as the Internet, an organization's network, an organization's virtual private network (VPN), or a branch location of an organization. User 104, computing device 110, network 130, etc. may be associated with one or more classes 160. In addition, data, such as an organization's confidential data, may be associated with a data class. For example, all accounting data may be associated with a data class that corresponds to a class 160 of employees in an accounting group.

In addition, users 104, computing devices 110, networks 130, etc. may belong to one or more classes 160, and such classes may overlap, or may be used to designate varying levels of access to stored data. For example, computing devices 110 may be located in a secured area and therefore associated with a particular class 160. Further, such computing devices 110 may routinely be accessed by a group of human resource managers that are associated with another class 160, or associated with the class 160 that includes the computing devices 110 located in the secured area. Human resource managers may be allowed a high-level of access to employee personnel data. However, a human resource manager may be prohibited from transferring confidential employee personnel data when that manager is using a computing device 110 that is outside of the secured area, or connected to an unsecured network 130, such as the Internet. Associating classes 160 with users 104, computing devices 110, and networks 130, traffic analyzer 140 can be configured to restrict data transfers under various scenarios.

Figure 2:
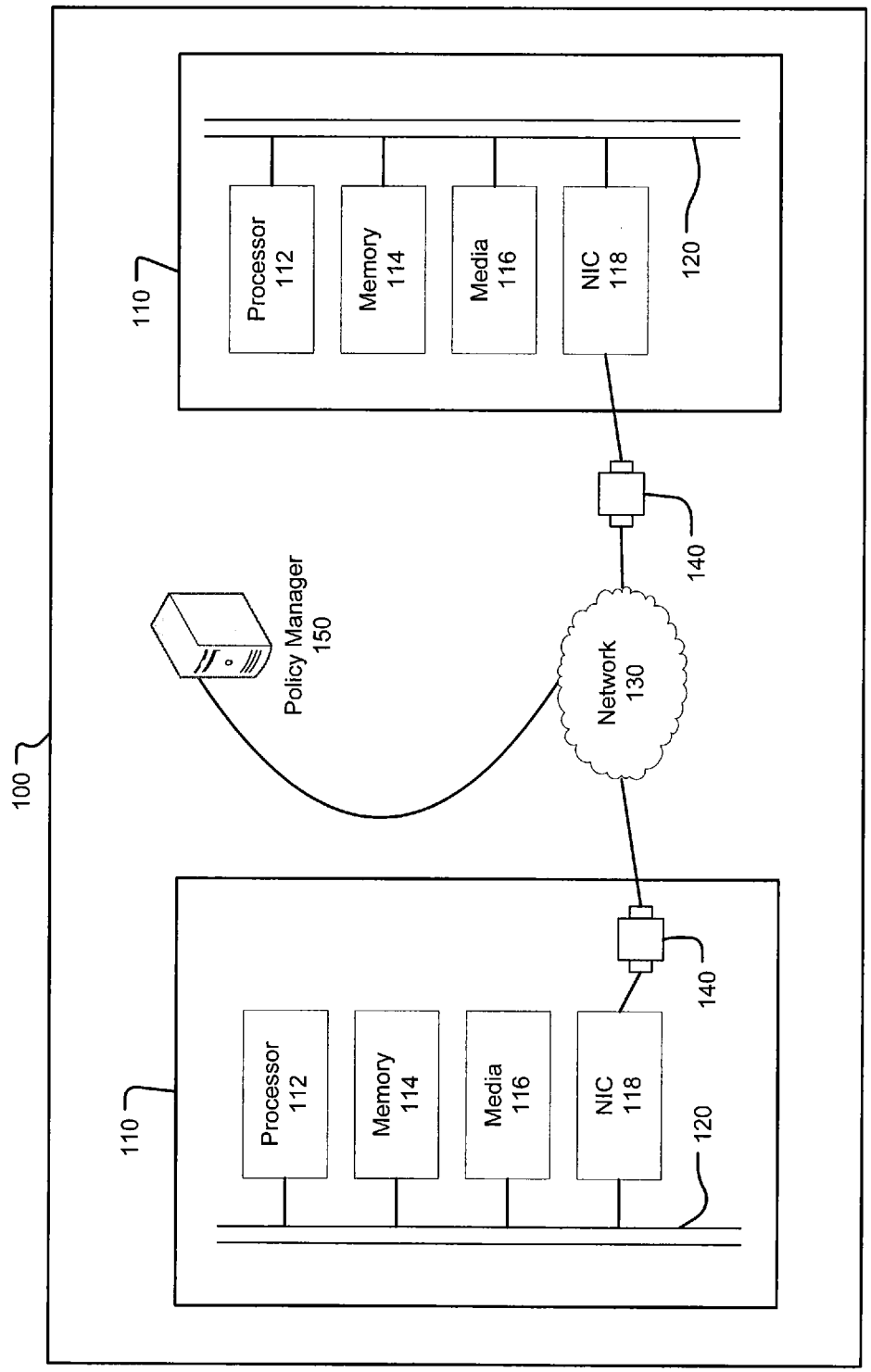
FIGS. 2-3 also illustrates exemplary systems for managing unauthorized data transfers.

Referring now to FIG. 2, computing devices 110 are shown in more detail. As illustrated, computing device 110 typically includes a process 112, memory 114, a computer-readable or processor-readable media 116, a network interface card (NIC) 118, which may communicate with one another using a system bus 120. Computing device 110 may also include traffic analyzer 140. For example, traffic analyzer 140 may be an additional component, such as an expansion card, or built into the system board or motherboard. In one example, NIC 118 and traffic analyzer 140 are one integrated component, where the combined component functions as both the NIC 118 and traffic analyzer 140. When using such an illustrative approach, traffic analyzer 140 is capable of analyzing electronic communications from a wireless interface, such as a Wi-Fi or Bluetooth NIC 118. Furthermore, when utilizing such an approach, traffic analyzer 140 may intercept and block such electronic communications before they leave computing device 110. For example, where computing device 110 is a personal digital assistant (PDA) or a cellular phone, NIC 118 and traffic analyzer 140 may be one integrated component that can monitor, intercept, and block wireless data communications.

Traffic analyzer 140 may also be a stand-alone unit, also illustrated in FIG. 2. As illustrated, traffic analyzer 140 may be a stand-alone device that lies in between NIC 118 and network 130. For example, traffic analyzer 140 may be a unit that accepts multiple Ethernet or patch cables, similar to a hub or switch. In such a configuration, traffic analyzer 140 may be selectively associated with one or more computing devices 110 through a direct, wired connection, for example. When incorporated as such, traffic analyzer 140 may analyze the electronic communication for multiple computing devices 110 simultaneously, and may identify each device depending on the particular port that the device is connected or plugged into. In another example, traffic analyzer 140 may be integrated into a wall-mounted port or jack, and selectively associated with only one computing device 110 through a direct, wired connection. Such an exemplary approach would ostensibly conceal the presence of traffic analyzer 140, while also ensuring that a computing device 110 would be required to connect to network 130 through traffic analyzer 140 for a wired connection.

Figure 3:
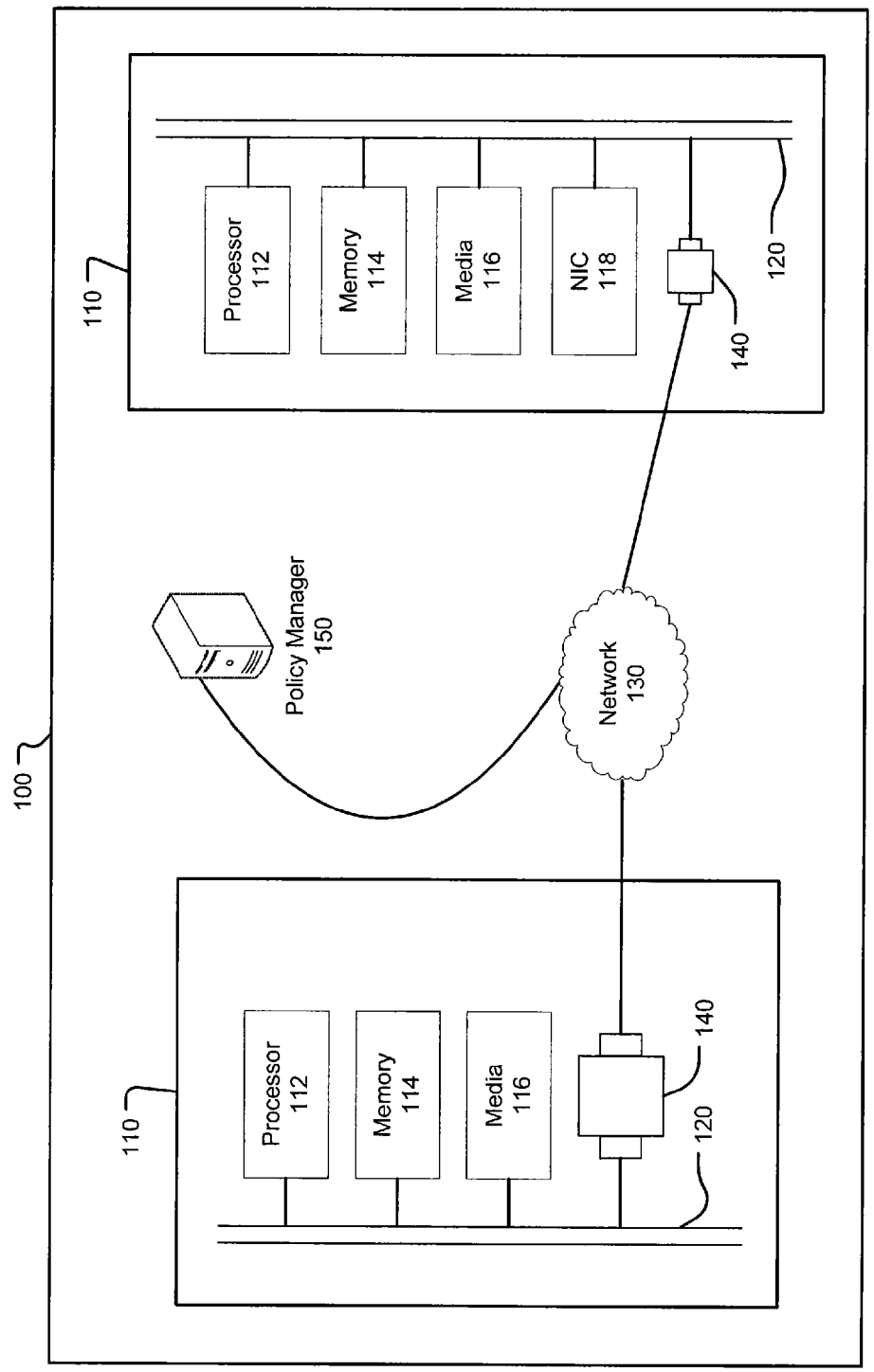

FIG. 3 illustrates additional examples of traffic analyzer 140 being integrated within computing device 110 in various ways. For example, as shown in FIG. 3, NIC 118 and traffic analyzer 140 may be one integrated component or device and communicate directly with other computing components over bus 120. For example, traffic analyzer 140 may receive data communications directly from processor 112 over bus 120, analyze the data communication, and then encode the data communication for transmission via network 130. In such an example, traffic analyzer 140 may perform operations described herein with reference to NIC 118. Further, in such a configuration, one traffic analyzer 140 is permanently associated with one computing device 110. Further, in such a configuration, traffic analyzer 140 can analyze data communications before such communications leave computing device 110, thereby potentially preventing an unauthorized data transfer from ever leaving computing device 110. Such a configuration is of additional significance when traffic analyzer 140 is integrated with a wireless NIC 118. In such a configuration, traffic analyzer 140 can prevent an unauthorized data transmission from being sent out wirelessly, where such data may be received by a hacker using a wireless sniffer.

Further, as also illustrated in FIG. 3, traffic analyzer 140 may communicate with NIC 118 over system bus 120. For example, computing device 110 may include a NIC 118, and a physical external network connection to traffic analyzer 140, but no external connection to NIC 118. Therefore, all data communication between computing device 110 and network 130 are required to travel through traffic analyzer 140.

Such a configuration allows traffic analyzer 140 to be independent of both any particular computer operating system and any particular network. For example, regardless of the operating system running on computing device 110, traffic analyzer 140 is capable of analyzing, and performing an action on, an electronic communication involving a data transfer. Further, neither a savvy user nor a software defect is likely to affect the performance of traffic analyzer 140 because the analyzer 140 is based in hardware, and does not rely on software running on computing device 110. Further, traffic analyzer 140 is able to monitor and prevent unauthorized data transfers even when a computing device is connected to an ad-hoc wireless network, or using a remote public network, such as a Wi-Fi hot spot. In an example where traffic analyzer 140 is integrated into computing device 110, traffic analyzer 140 is capable of preventing a data transmission from leaving computing device 110, even on wireless networks. Further, by preventing a data transmission on a wireless network interface adapter, traffic analyzer 140 can prevent a hacker using a wireless sniffer from capturing the data during transmission between computing device 110 and a wireless access point. In addition, one traffic analyzer 140 is typically associated with only one computing device 110. Such a one-to-one relationship simplifies policy enforcement and ensures that a mobile computing device 110 is constantly monitored by a traffic analyzer 140. Further, a one-to-one relationship provides dedicated processing resources to each computing device 110, as opposed to sharing processing resources between multiple computing devices, which can lead to potential saturation or overloading of a single shared device.

Figure 4:
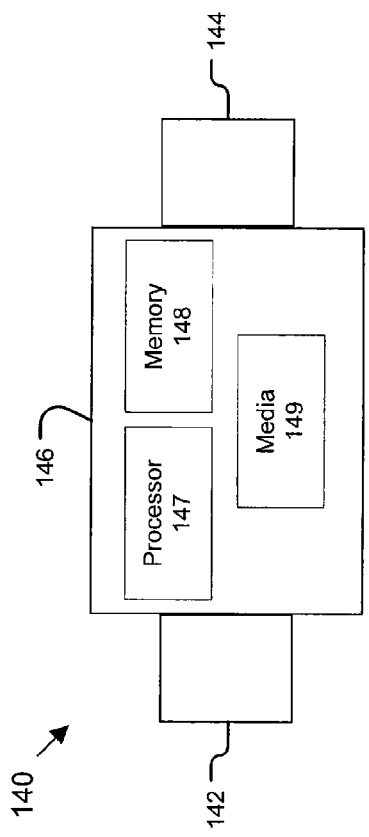
FIG. 4 illustrates an exemplary traffic analyzer.

FIG. 4 illustrates an exemplary traffic analyzer 140. Traffic analyzer 140 typically includes a device connection 142, a network connection 144, and an analyzing engine 146. Connections 142, 144 may be wired or wireless network interface adapters, including Bluetooth, Wi-Fi, Ethernet, Token Ring, fiber optic, USB, or any other suitable network interface that is capable of communicating electronic data between computing device 110 and another device through network 130. Typically, electronic communications between computing device 110 and network 130 travel through traffic analyzer 140. Traffic analyzer 140 connects to computing device 110 using device connection 142, and connects to network 130 using network connection 144. Traffic analyzer 140 may also be an integrated NIC 118, as previously discussed. In such an illustrative approach, device connection 142 may connect to bus 120 and network connection 144 may be a network port, such as an Ethernet RJ-45 port that connects to network 130.

Analyzing engine 146 manages and monitors electronic communications between computing devices 110 that communicate over network 130. Analyzing engine 146 may monitor such network traffic in real-time, or near real-time, in order to ensure that communications between computing devices 110 are not degraded. Of course, in certain situations, analyzing engine 146 may receive and temporarily store a plurality of data packets or frames in order to analyzing a data transfer, monitor a communication, or perform some other function.

Analyzing engine 146 may include a processor, memory, and computer-readable medium, and be configured to selectively send and receive electronic communications and/or data with computing device 110 and policy manager 150. Analyzing engine may also be a microcontroller or microprocessor that includes an embedded operating system and computer-readable instructions for carrying out various operations discussed below. Further, analyzing engine 146 may include hardware and software that allow analyzing engine 146 to receive a plurality of data packets that make up a data communication, extract a data payload from each packet, reassemble the data payloads, and analyze the data communication.

In one example, traffic analyzer 140 is capable of exchanging electronic communications between computing device 110 and network 130, but is incapable of receiving any type of configuration instructions or a policy from computing device 110. For example, traffic analyzer 140 may communicate with policy manager 150 over a particular protocol or port, such as by using an encrypted tunnel. Traffic analyzer 140 may also be configured to refuse or reject any attempted configuration instructions received on device connection 142, or any instructions received on network connection 144 that appear to originate from computing device 110.

Figure 6:
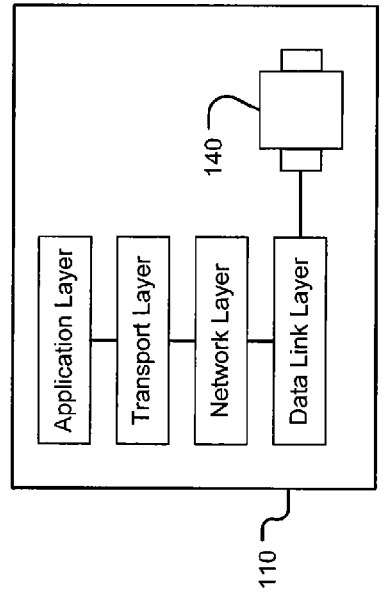
FIGS. 5-6 illustrate abstract configurations of computing devices that include a traffic analyzer.
Figure 5:
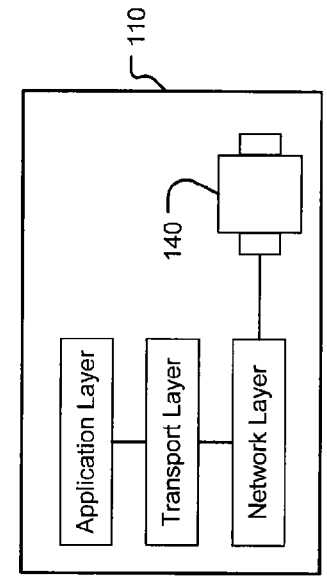

As illustrated in FIGS. 5 and 6, traffic analyzer 140 may be integrated within computing device 110 in number of different configurations. FIGS. 4 and 5 both illustrate various abstract configurations implemented in hardware, software, or any combination. For example, as shown in FIG. 4, traffic analyzer 140 may communicate with computing device 110 through a network layer of the Open Systems Interconnection basic reference (OSI) model. In such a scenario, traffic analyzer 140 may be integrated into NIC 118, or some other component that handles network layer operations. As illustrated in FIG. 5, traffic analyzer 140 may communicate with computing device 110 through a data link layer of the OSI model. In such a configuration, traffic analyzer may communicate with NIC 118, or may be integrated into some other component that handles data link layer operations. Traffic analyzer 140 may be integrated into numerous different computing components or sub-components. For example, traffic analyzer 140 may be integrated into a system board or mother board component that handles communication to one or more network interfaces, such as a wired or wireless network interface component. Further, a traffic analyzer 140 may be integrated directly into each network interface component in computing device 110.

Traffic analyzer 140 may be directly connected to a computing device 110 and configured to monitor and manage electronic data communications generated by computing device 110. In another example, NIC 118 may be configured to handle various network layer functions, while traffic analyzer 140 is configured to handle physical layer functions, according to the OSI model. In one example, computing device 110 is a portable computing device that is capable of communicating over a wireless network. Computing device 110 may include an integrated NIC and traffic analyzer 140, where traffic analyzer 140 can receive data communications from processor 112, analyze the data, encode the data for travel over network 130, and then physically send the data communication over a wireless signal to a network access point, for example.

Figure 7:
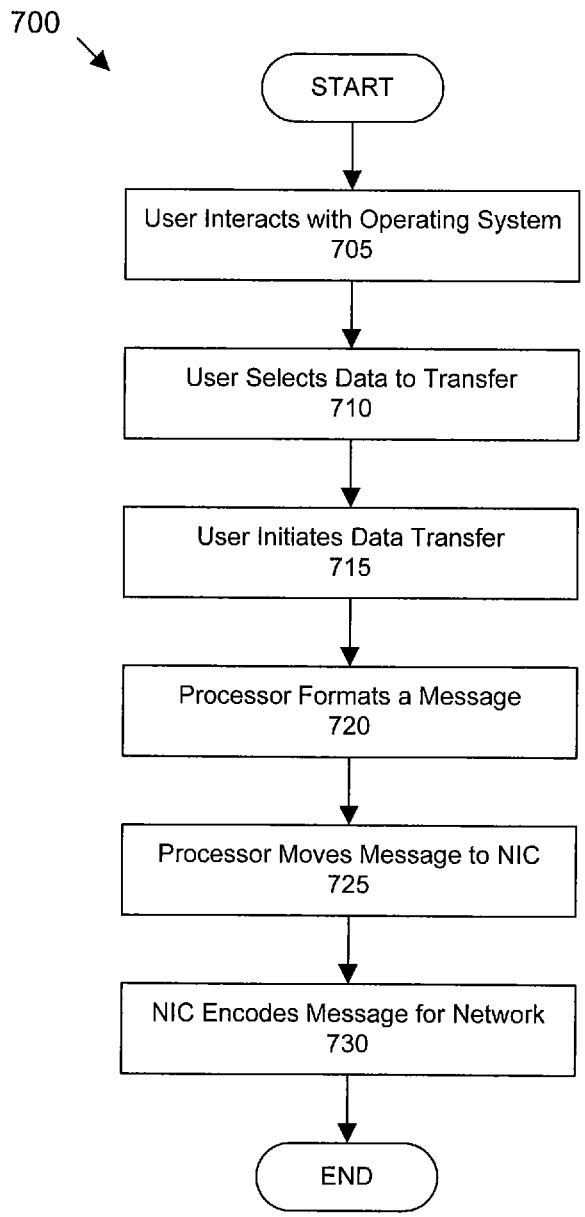
FIG. 7 illustrates an exemplary process for generating an electronic data communication.

FIG. 7 illustrates an exemplary process 700 for generating an electronic data communication. Process 700 begins in step 705 when a user 104 interacts with an operating system. Generally, computing device 110 includes an operating system that provides a user interface for user 104. The operating system of computing device 110 may allow user 104 to access data stored locally or remotely, such as a shared network drive or remote data store.

Next, in step 710, user 104 selects data to transfer. Again, such data may be stored locally or remotely. Further, user 104 may select any number of different mechanisms to transfer the data. For example, user 104 may attempt to email the selected data; to upload the selected data to a website; to use a data transfer software package to transfer the data; to send the data using an instant messaging client; etc.

Next, in step 715, user 104 initiates a data transfer. Initiating the data transfer may include clicking a "Send" button in an email client, for example. Generally, once initiated, computing device 110 facilitates transferring the data.

Next, in step 720, processor 112 of computing device 110 formats a message to include the selected data. Formatting a message may include formatting the selected data into an electronic data communication that is capable of being sent to a network interface card and transported over a network. For example, formatting a message may include specifying a protocol, providing a destination address, and placing the selected data into a format that is appropriate for the selected protocol.

Next, in step 725, processor 112 moves the formatted message to NIC 118. In one example, discussed above, NIC 118 and traffic analyzer 140 are one integrated device, as shown in FIG. 3, and processor 112 moves the formatted message directly to traffic analyzer 140.

Next, in step 730, NIC 118 encodes the message for network 130. Again, in an example where NIC 118 and traffic analyzer 140 are an integrated device, traffic analyzer 140 can handle the encoding as well as the monitoring and managing. Further, in such an example, traffic analyzer 140 may communicate directly with processor 112 over system bus 120. As such, traffic analyzer 140 can monitor and manage the potential electronic data communication before the data is encoded for network 130. Traffic analyzer 140 typically monitors and manages electronic communications according to a policy, which may be provided by policy manager 150.

Figure 8:
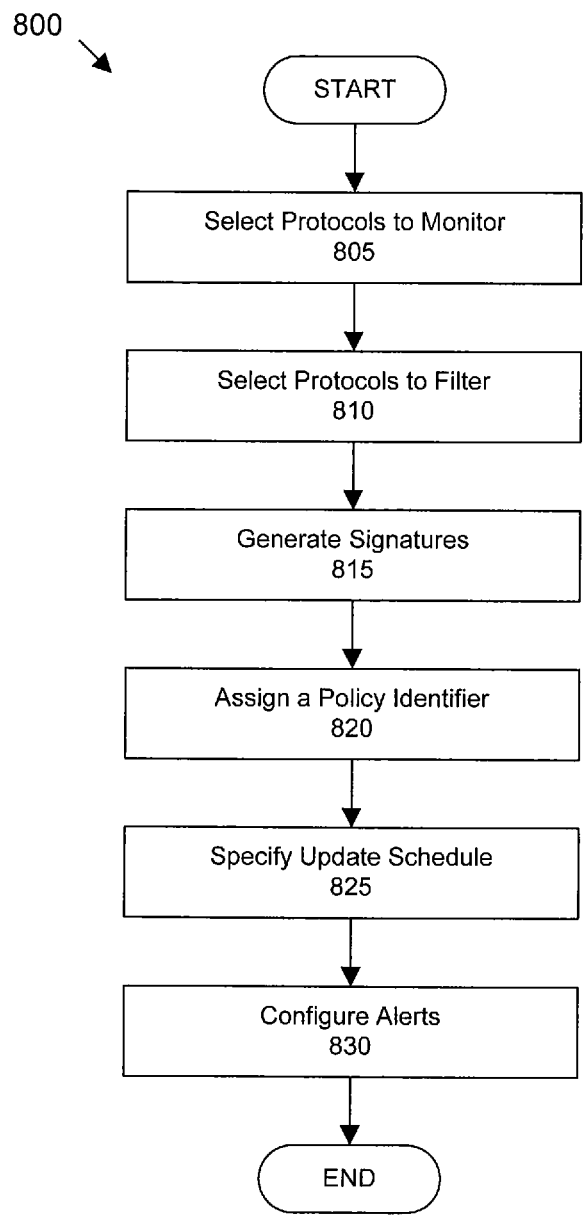
FIG. 8 illustrates an exemplary process for establishing a policy.

FIG. 8 illustrates an exemplary process 800 for establishing a policy. Generally, a policy is a set of computer-readable instructions that are used to program or alter how traffic analyzer 140 manages electronic communications between computing device 110 and another device that communicate over network 130. A policy may be stored in a file, provided from a database, a configuration script, etc. A policy may be used to ensure that one or more traffic analyzers 140 operate in a uniform fashion, or according to various rules based on one or more factors or classes 160. Process 800 may be carried out in any number of different ways, including through an administration website provided by policy manager 150, or through software available on one or more computing devices 110. Generally, a user 104, such as a manager of information services or information technology manager, establishes a policy as outlined in process 800.

Process 800 begins in step 805 by user 104 selecting one or more protocols to monitor. For example, traffic analyzer 140 may monitor communications in an IP network, which can include numerous different protocols. For efficiency or other reasons, an organization may choose to ignore certain protocols and monitor others. For example, an organization may choose to ignore protocols that are not typically used to transfer data, such as the Internet Control Message Protocol (ICMP). In addition, an organization may choose to ignore certain encrypted protocols as traffic analyzer 140 may be unable to examine the data payload for such encrypted protocols. Further, an organization may choose to ignore certain protocols that are blocked at a firewall or connection to an external network. For example, an organization may choose to block certain protocols at an edge device, such as a firewall or router that connects an organization's internal network 130 to an external network 130, such as the Internet.

Next, in step 810, user 104 may select one or more protocols to be filtered. For example, an organization may choose to block all encrypted protocols, or block certain unencrypted or potentially less secure protocols. For example, an organization may choose to block all protocols that send usernames and passwords in clear text. Blocking such protocols may be done on an edge device, but certain intra-network communications, such as inter-office communications, may not traverse those edge devices. Therefore, an organization may desire to block or filter such protocols at each computing device 110, thereby potentially preventing such data transfers before they leave computing device 110.

Next, in step 815, user 104 generates one or more signatures. A signature may be any type of instructions that are included in a policy in order to affect how traffic analyzer 140 manages electronic communications to and from computing device 110. A signature may include one or more of the following: a protocol, a class 160, a key word, a source address, a destination address, a timeframe, and an action. Traffic analyzer 140 may be directed to monitor one or more protocols, and a signature may be directed to all monitored protocols, a sub-set of monitored protocols, or only one protocol. A signature may be used to instruct traffic analyzer 140 to block all electronic communications that use a particular protocol, such as the file transfer protocol (FTP), or an instant messaging protocol. For example, traffic analyzer 140 may be capable of analyzing various segments of a packet or frame, including a source address, a destination address, a protocol identifier, and even a data payload in order to monitor for particular keywords.

A signature may include one or more keywords, data formats, heuristic algorithms, protocols, data classes, classes 160, etc, and may also include various attributes regarding such a keyword, data format, or heuristic algorithm. For example, a signature may include instructions to monitor electronic communications (i.e. traffic) for a social security number format, an account or record number format, a credit card format, a group of specific account or record numbers, a group of names, confidentiality statements, etc. Traffic analyzer 140 may be configured to monitor data contained in a payload of a packet or frame and search for particular characteristics, including a keyword.

For example, traffic analyzer 140 may collect multiple data packets, reassemble the data payload, and search for a keyword. For instance, a user 104 may attempt to send a file that contains confidential information about a particular subject, where the file includes a keyword. Traffic analyzer 140 may intercept the packets carrying the file, reassemble the packets, extract the data payload, and search for the keyword in the file. Upon finding the keyword, traffic analyzer may perform an action, such as by reporting the attempted file transfer. A signature may include a limitation that a keyword must be found in a specific type of file, from a particular data store or repository, from a certain class 160 of computing devices 110, from a particular class 160 of users 104, from a particular data class, etc. For example, a user 104 may have a low-level security clearance, as denoted by a particular class 160, and a file that the user 104 is attempting to send may require a higher-level security clearance, as denoted by the file's associated data class. A signature may be used to configure traffic analyzer 140 such that the file associated with that particular data class can only be forwarded if user 104 belongs to a particular class 160. Further, should a signature specify that the file cannot be forwarded, traffic analyzer may perform an action, such as by reporting the incident, or blocking the attempted communication.

As previously discussed, traffic analyzer 140 may be configured to filter certain data communications depending on the class 160 associated with network. For example, a user 104 may have a high-level of access, as denoted by a particular class 160. Traffic analyzer 140, using a signature within a policy, may be configured to restrict any data transfer that includes confidential data to secure or encrypted protocols when user 104 is using an unsecured computing device 110, or an unsecured or open network 130.

Traffic analyzer 140 may be capable of analyzing many different communication protocols, from hardware, low-level protocols to higher-level application layer protocols, including detecting a source and destination address associated with such protocols. Therefore, a signature may be applied to all traffic, or limited to traffic to or from certain computing devices 110. A signature may also be based on a timeframe. For example, a signature may specify that all traffic should be blocked during a particular timeframe, such as during non-working hours, for a particular class 160 of computing devices 110. In addition, a signature may include one or more actions to perform should the requirements of the signature be met. An action may include one or more of the following: generate an incident log; send an alert; monitor the communication; record the communication; obfuscate or alter the data, or a portion of the data; block the communication; etc.

Next, in step 820, user 104 assigns a policy identifier. An organization may utilize multiple policies, and can use a policy identifier to distinguish one policy from another. For example, an organization may generate a policy for different classes 160, such as different classes 160 of users 104, computing devices 110, etc. A policy identifier may be a number, a letter, a word, a code, etc. Further, traffic analyzer 140 may enforce a particular policy based on a class 160 of users 104.

For example, traffic analyzer 160 may enforce a particular policy based on the user 104 that is currently logged into computing device 110. Traffic analyzer 140 may store multiple policies in memory, and enforce a particular policy based on a class 160, or traffic analyzer 140 may download a particular policy from policy manager 150 based on a class 160.

Next, in step 825, user 104 specifies an update schedule. A policy may include an update schedule, thereby instructing traffic analyzer 140 when to seek an update to one or more policies, signatures, firmware, software, data, or some other type of update. For example, one or more traffic analyzers 140 may be configured to search a signature database stored in policy manager 150 every night for updated signatures. To manage bandwidth in a local network 130, different groups of traffic analyzers 140 may be scheduled to receive updates at different days or times.

Next, in step 830, user 104 configures an alert. A signature may include an instruction to send an alert, and traffic analyzer 140 and/or policy manager 150 may be configured to send such an alert to one or more of the following; a computing device 110, a policy manager 150, a user 104, a database, a website, etc. Configuring an alert may include providing an address for a particular computing device 110; defining which pieces of information to include in the alert; formatting the appearance of an alert; assigning a timeframe when to deliver a particular alert; and assigning a category of an alert. For example, a policy may include multiple levels of alerts, such as a notification alert, a suspicious activity alert, a violation alert, and an emergency alert. Each level may be configured to be sent to a particular location, include various pieces of information, and be sent during certain timeframes. For example, an emergency email alert may be formatted to include one color and be sent at anytime to a responsible human resources employee, while a notification alert may include another color and format and only be sent during working or simply stored in an event log. Further, traffic analyzer 140 may be configured to send all alerts to policy manager 150, thereby allowing policy manager 150 to decide whether to pass along the alert to a user 104 or a device, such as computing device 110.

Following step 830, process 800 ends. Once a policy is established, the policy may be stored in policy manager 150 and prepared for distribution to one or more traffic analyzers 140. A policy may be stored in any number of different configurations, including being stored in a file or in a database.

Figure 9:
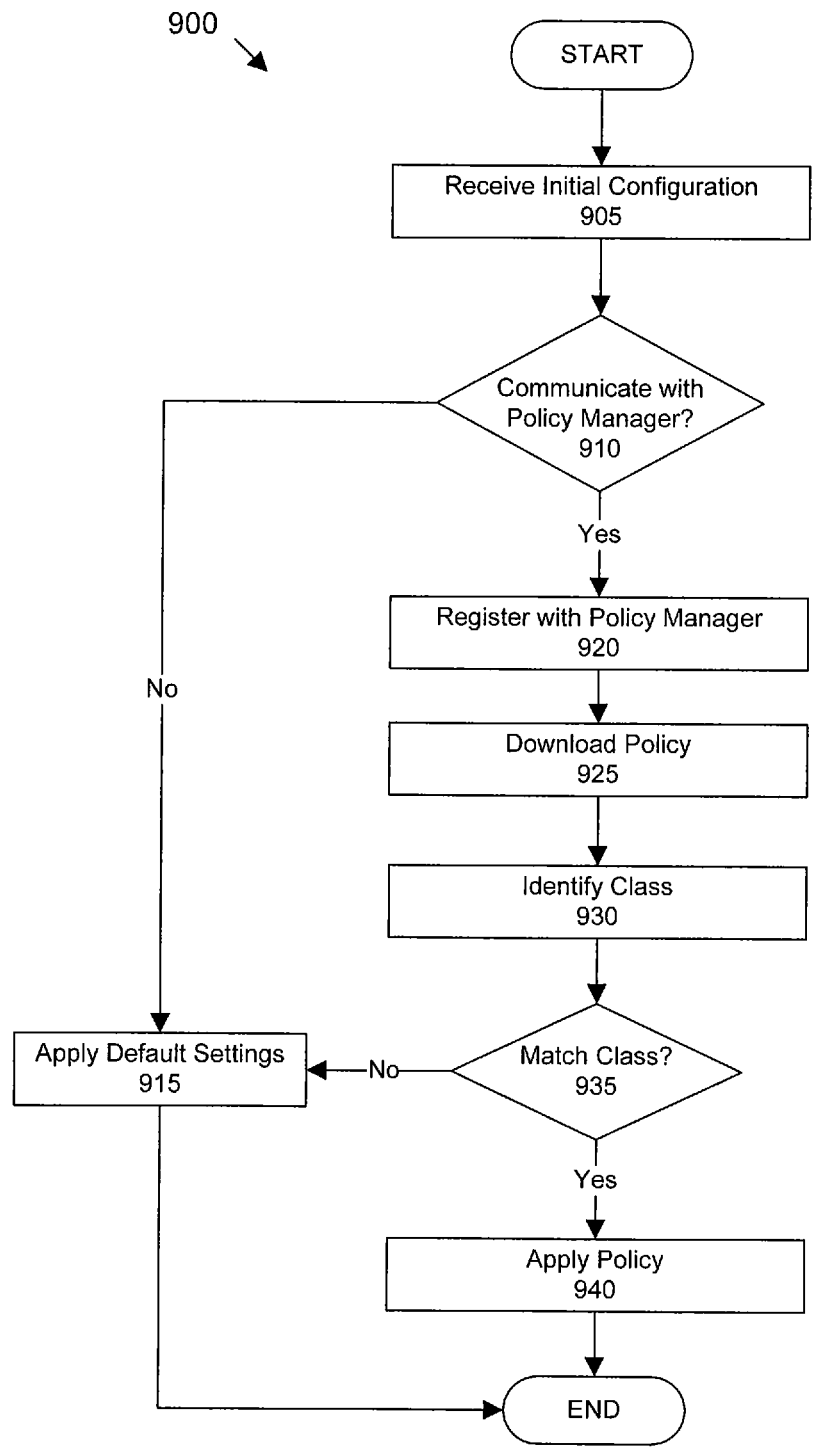
FIG. 9 illustrates an exemplary process for configuring a traffic analyzer.

FIG. 9 illustrates an exemplary process 900 for configuring a traffic analyzer 140. Process 900 begins in step 905 when a traffic analyzer 140 receives an initial configuration. Traffic analyzer 140 may receive an initial configuration at anytime, and may receive an initial configuration during manufacturing. An initial configuration may be a series of default settings programmed by a manufacturer or assembler, for example.

Next, in step 910, traffic analyzer 140 determines whether it can communicate with policy manager 150. Traffic analyzer 140 may attempt to contact policy manager 150, for example, by sending a broadcast message over network 130 or by contacting policy manager 150 directly at a pre-determined address. If traffic analyzer 140 cannot communicate with policy manager 150, then traffic analyzer 140 proceeds to step 915. If traffic analyzer 140 can communicate with policy manager 150, then traffic analyzer 140 proceeds to step 920.

In step 915, traffic analyzer 140 applies default settings. For example, traffic analyzer 140 may be configured to block all traffic unless a policy specifies otherwise. If traffic analyzer 140 is unable to communicate with policy manager 150 and receive a policy, the default settings may be used thereby preventing any electronic communication through traffic analyzer 140. The default settings may be permissive, on the other hand, allowing all communication to pass freely unless a policy specifies otherwise. Following step 915, process 900 ends, having configured traffic analyzer 140 with the default settings. The default settings may also include a timeframe for attempting to contact a policy manager 150 again in the future to obtain a policy.

In step 920, traffic analyzer 140 registers with policy manager 150. Generally, registering may include providing one or more of the following to policy manager 150: a name of computing device 110, an address, a class 160, a policy identification, and a time. Registering with policy manager 150 may ensure that policy manager 150 provides appropriate updates to traffic analyzer 140.

Next, in step 925, a policy is downloaded to traffic analyzer 140. Traffic analyzer 140 may download a policy from policy manger 150, or a policy may be pushed onto traffic analyzer by a computing device, such as policy manager 150.

Next, in step 930, traffic analyzer 140 attempts to identify a class 160. Class 160 may refer to a user 104 that is logged onto the system, a type of computing device 110, a particular network 130, or a traffic analyzer 140. For example, traffic analyzer 140 may be instructed that it belongs to a particular class 160.

Next, in step 935, traffic analyzer 140 determines if the class 160 identified in step 925 matches a class 160 in the policy downloaded in step 920. If there is no match, then traffic analyzer 140 applies the default settings as discussed in step 915, and process 900 ends. If traffic analyzer 140 determines that there is a match, then traffic analyzer 140 proceeds to step 940.

In step 940, traffic analyzer 140 applies the policy downloaded in step 925. Following step 940, process 900 ends. After process 900 ends, traffic analyzer 140 will either be configured with one or more policies, or with the default settings. Once configured with one or more policies, such policies can remain in effect regardless of whether traffic analyzer 140 can communicate with policy manager 150. For example, computing device 110 may be a laptop with an integrated device that includes a NIC 118 and a traffic analyzer 140. User 104 may take a laptop from an organizations internal network 130 to use on a home network 130 or a Wi-Fi public network 130. Regardless of the particular network to which the laptop connects, traffic analyzer 140 will continue to enforce the policy. In addition, traffic analyzer 140 may enforce a different policy that was downloaded in step 925 that corresponds to a class 160 that corresponds to the network 130 that computing device 110 is currently connected. For example, an organization may provide different policies based on whether a computing device 110 is connected to an internal network 130 or directly to the Internet through a public or external network 130.

Figure 10:
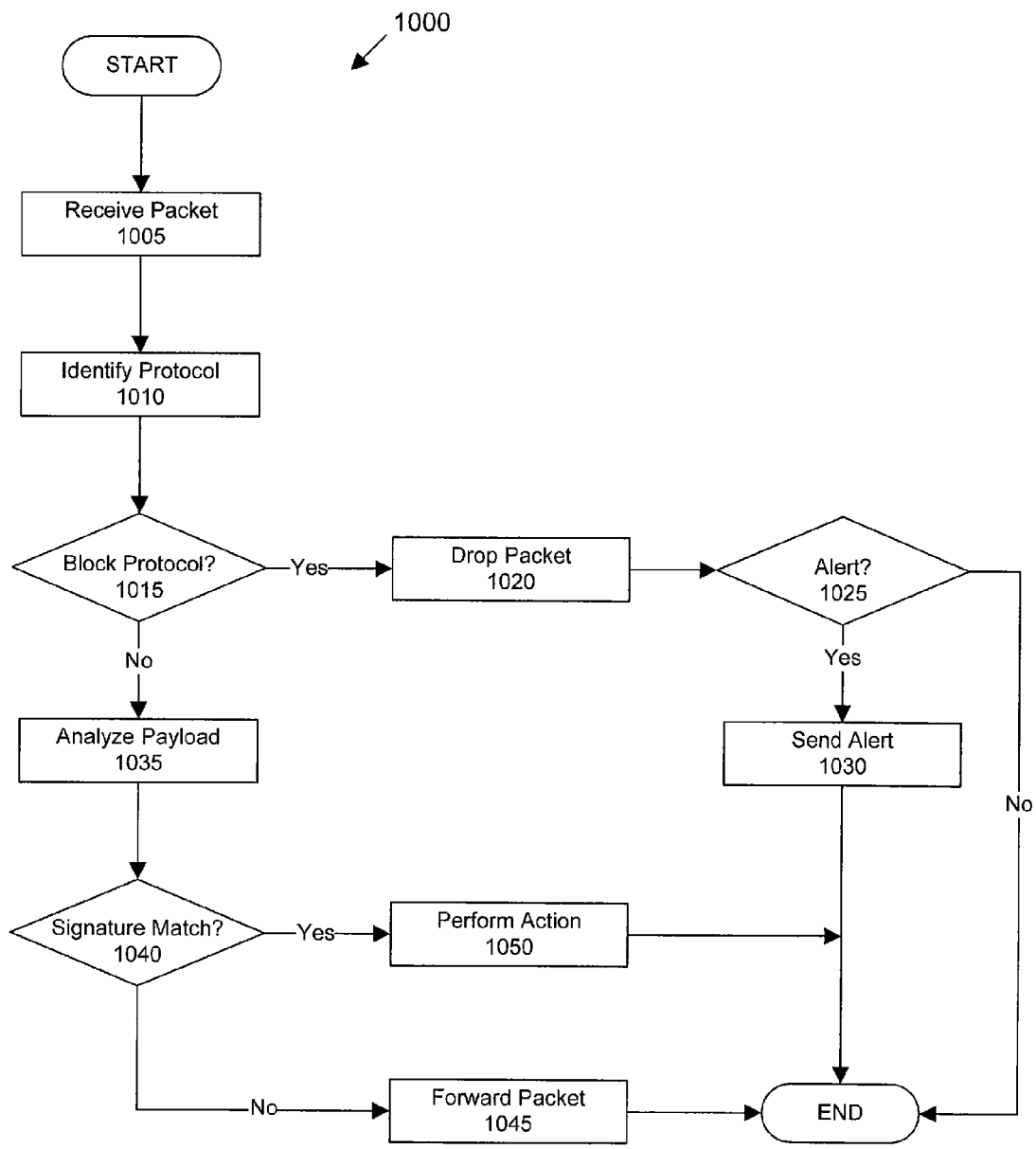
FIG. 10 illustrates an exemplary process for enforcing a policy.

FIG. 10 illustrates an exemplary process 1000 for enforcing a policy. Process 1000 begins in step 1005 when traffic analyzer 140 receives a data packet. The data packet may be received on either device connection 142 or network connection 144. For example, traffic analyzer 140 may be configured to only monitor traffic received on device connection 142, thereby monitoring electronic communications originating from computing device 110. Of course, traffic analyzer 140 may be configured to monitor traffic received on either connection, or only on network connection 144.

Next, in step 1010, traffic analyzer 140 identifies a protocol associated with the received data packet.

Next, in step 1015, traffic analyzer 140 determines if the protocol identified in step 1010 should be blocked. Generally, such a determination is based on the applied policy or default configuration. If the identified protocol should be blocked, then traffic analyzer 140 proceeds to step 1020. If the identified protocol should not be blocked, then traffic analyzer 140 proceeds to step 1035.

In step 1020, traffic analyzer 140 drops the received packet. Generally, the packet will be discarded and will not be forwarded through traffic analyzer 140.

Next, in step 1025, traffic analyzer 140 determines if an alert should be sent. Generally, such a determination is made according to the applied policy. If an alert should be sent, traffic analyzer proceeds to step 1030. If an alert should not be sent, process 1000 ends.

In step 1030, traffic analyzer 140 sends an alert, typically according to the applied policy. Of course, traffic analyzer 140 may be configured to forward all alerts to a centralized computing device, such as policy manager 150, and allow that device to forward the alert to an appropriate computing device 110 or user 104.

In step 1035, traffic analyzer 140 analyzes the payload of data packet received in step 1005. Traffic analyzer 140 may receive and store multiple packets in order to reassemble a data communication, such as a file or a message, in order to better analyze the data payload.

Next, in step 1040, traffic analyzer 140 determines if the payload matches a signature. For example, the payload may include a keyword, a source or destination address, or trigger a response based on heuristics. If traffic analyzer 140 determines that the payload does not match any signatures, then traffic analyzer 140 proceeds to step 1045. If traffic analyzer 140 determines that the payload does in fact match a signature, then traffic analyzer 140 proceeds to step 1050.

In step 1045, traffic analyzer 140 forwards the packet. Typically, the packet will be forwarded with no modifications. If the packet was received on device connection 142, then it will be forwarded to network connection 144 and out to network 130. If the packet was received on network connection 144, then it will be forwarded to device connection 142 and delivered to computing device 110. Following step 1045, process 1000 ends.

In step 1050, traffic analyzer 140 performs an action, generally according to the matched signature or policy. As previously discussed, the action may include one or more of the following: generating an incident log; sending an alert; monitoring the communication; recording the communication; obfuscating or altering the data, or a portion of the data; blocking the communication; and rejecting the communication. A signature may specify that the traffic is allowed to proceed, but the incident is logged.

Further, an action may include sending one or more alerts. Another action may include allowing the communication to be forwarded, but only after obfuscating or altering at least a portion of the data. For example, in a communication including credit card numbers, the data may be altered such that only the last four digits of the credit card number are forwarded. Blocking or dropping the traffic, in certain situations, may ensure that the data is not transferred, and the user 104 attempting to transfer the data is unaware that the transmission failed. In other circumstances, the communication may be rejected, thereby both preventing the unauthorized data transfer and also alerting the user 104 that the transfer failed or was rejected. Following step 1050, process 1000 ends.

Computing devices, such as computing device 110, traffic analyzer 140, policy manager 150, and other devices mentioned herein may employ any of a number of known computer operating systems. For example, such devices may use any known versions and/or varieties of the MICROSOFT WINDOWS operating system; the Unix operating system (e.g., the SOLARIS operating system distributed by Sun Microsystems of Menlo Park, Calif.); the AIX UNIX operating system distributed by International Business Machines of Armonk, N.Y.; and the LINUX operating system and the Vortex operating system distributed by Motorola, Inc. of Schaumberg, Ill. Computing devices may include any one of a number of computing devices that are known, including, without limitation, a computer workstation, a desktop, notebook, laptop, handheld computer, or some other computing device. As previously discussed, such computing devices, such as traffic analyzer 140, may also use an embedded operating system or a proprietary operating system.

Computing devices, such as computing device 110, traffic analyzer 140, policy manager 150, and other devices mentioned herein, generally are capable of executing instructions stored on a computer readable medium, such as instructions for performing one or more of the above-identified processes. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any medium that participates in providing data (e.g., instructions) that may be read by a computer (e.g., by a processor of a computer, a microcontroller, etc.). Such a medium may take many forms, including, but not limited to, non-volatile media and volatile medial. Non-volatile media may include, for example, optical or magnetic disks and other persistent memory. Volatile media may include, for example, dynamic random access memory (DRAM), which typically constitutes a main memory. A transmission media may facilitate the processing of instructions by carrying instructions from one component or device to another. For example, a transmission media may facilitate electronic communication between computing devices 110 and network 130. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims. All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

We claim:

1. A system comprising:
a processor to:
receive a policy from a policy manager,
the policy including a signature,
receive a plurality of data packets from a computing device,
extract data payloads from the plurality of data packets,
reassemble a message from the extracted data payloads,
identify a class associated with the computing device,
the class designating a group of computing devices,
the group of computing devices including the computing device, and
the group of computing devices being one or more of:
associated with a same organizational unit of a company as an employee, of the company, that is using the computing device,
a same type of device as the computing device, or
located in a same area as the computing device, and
selectively forward, based on the signature and the class, at least a portion of the message to a different computing device that is not part of the group of computing devices,
the signature being associated with instructions for managing traffic from the class, and
the traffic including the portion of the message.

2. The system of claim 1, where the processor is further to:
facilitate data communications between the computing device and a network,
the data communications including the forwarding of the portion of the message via the network.

3. The system of claim 1, where the processor is further to:
reject configuration instructions from the computing device.

4. The system of claim 1, where the processor is further to:
monitor data communications between the computing device and the different computing device by comparing a data class of the data communications to the class associated with the computing device.

5. The system of claim 1, where the processor is further to:
  determine that the message meets a requirement of the signature, and
  perform one or more actions associated with the signature when the message meets the requirements of the signature,
    where, when performing the one or more actions, the processor is to:
      generate an incident log,
      send an alert,
      record the message,
      obfuscate at least a second portion of the message,
      remove at least the second portion or a third portion of the message,
      block the message, or
      reject the message.

6. The system of claim 1, where the instructions for managing the traffic comprise instructions for when the message is received during a particular timeframe.

7. The system of claim 1, where the instructions for managing the traffic comprise one or more of:
  instructions for when the message includes a number with a particular format, or
  instructions for when the message includes a particular keyword.

8. The system of claim 1, where, when selectively forwarding the portion of the message, the processor is to:
  alter the portion of the message to obtain an altered portion that includes only a particular quantity of numbers included in the portion of the message, and
  forward the altered portion to the different computing device.

9. A device comprising:
  a processor to:
    receive a policy from a policy manager,
      the policy including a signature,
    receive a plurality of data packets from a computing device,
    extract data payloads from the plurality of data packets,
    reassemble data from the extracted data payloads,
    identify a class associated with the computing device,
      the class designating a group of computing devices,
        the group of computing devices including the computing device, and
        the group of computing devices being one or more of:
          associated with a same organizational unit of a company as an employee, of the company, that is using the computing device,
          a same type of device as the computing device, or
          located in a same area as the computing device, and
    block, based on the class and the signature, at least a portion of the data from being sent to a different computing device that is not part of the group of computing devices,
      the signature being associated with instructions for managing traffic from the class, and
    the traffic including the data.

10. The device of claim 9, where the processor is further to:
  perform a particular action based on the class and the signature,
    where, when performing the action, the processor is to one or more of:
      generate an incident log based on the data,
      send an alert based on the data,
      record the data,
      obfuscate another portion of the data,
      or
      reject the data.

11. The device of claim 9, where the processor is further to: transmit a different portion of the data to the different computing device via a network connection that includes at least one of an Ethernet connection, a fiber connection, a Wi-Fi connection, or a Bluetooth connection.

12. The device of claim 9, where the processor is further to:
  selectively forward a different portion of the data to the different computing device based on the signature.

13. The device of claim 11, where the policy is received via the network connection.

14. The device of claim 9, where the processor is further to:
  selectively forward a different portion of the data based on the policy and the class.

15. The device of claim 9, where the processor is further to:
  monitor data messages between the computing device and the different computing device by comparing a data class of the data messages to the class associated with the computing device.

16. The device of claim 9, where the instructions for managing the traffic comprise one or more of:
  instructions for when the data includes a number with a particular format,
  instructions for when the data includes a particular keyword, or
  instructions for when a destination of the data is specified as a particular destination address.

17. The device of claim 9, where the instructions for managing the traffic comprise instructions for when the data is received during a particular timeframe that is defined as non-working hours.

18. The device of claim 9, where the processor is further to:
  provide an alert to the computing device that a transfer of the portion of the data failed or was rejected.

19. A method comprising:
  receiving, by a device and from a policy manager, a policy via a network connection, the policy including at least one signature;
  receiving, by the device and from a computing device, a plurality of data packets via a system bus;
  extracting, by the device, data payloads from the plurality of data packets;
  reassembling, by the device, data from the extracted data payloads;
  identifying, by the device, a class associated with the computing device,
    the class designating a group of computing devices,
      the group of computing devices including the computing device, and
      the group of computing devices being one or more of:
        associated with a same organizational unit of a company as an employee, of the company, that is using the computing device,
        a same type of device as the computing device, or
        located in a same area as the computing device; and
  selectively forwarding, based on the at least one signature and the class, a portion of the data to a different computing device that is not part of the group of computing devices,
    the at least one signature being associated with instructions for managing traffic from the class, and
    the traffic including the data.

20. The method of claim 19, further comprising:
  establishing the policy by generating a plurality of signatures that include the at least one signature,
    each one of the plurality of signatures including one or more of:
      instructions for when the data includes a number with a particular format,
      instructions for when the data uses a particular protocol,
      instructions for when the data includes a particular keyword, instructions for when the data is received during a particular timeframe, or instructions for when a destination of the data is specified as a particular destination address.

21. The method of claim 19, further comprising:

identifying a data class in the policy;

comparing the data class in the policy to the class associated with the computing device to determine whether the data class in the policy matches the class associated with the computing device; and performing an action when the data class in the policy matches the class associated with the computing device.

22. The method of claim 19, where selectively forwarding the portion of the data comprises:

comparing the portion of the data to the at least one signature to determine whether the portion of the data matches the at least one signature; and selectively forwarding the portion of the data based on determining whether the portion of the data matches the at least one signature.

23. The method of claim 19, further comprising:

comparing the at least one signature to the data to determine whether the data matches the at least one signature; and performing one or more actions when the at least one signature matches the data, where performing the one or more actions includes one or more of:

generating an incident log based on the data, sending an alert based on the data, recording the data, obfuscating a second portion of the data, removing the second portion or a third portion of the data, blocking a data communication that includes the data, or rejecting the data communication that includes the data.

24. The method of claim 19, further comprising blocking a transmission of the data while a connection to the policy manager is unavailable.

25. The method of claim 19, where receiving the plurality of data packets includes receiving the plurality of data at a particular time, and where selectively forwarding the portion of the data includes:

determining that the particular time is not during a particular timeframe specified by the at least one signature, and forwarding the portion of the data to the different computing device after determining that the particular time is not during the particular timeframe.

* * * * *